April 11, 1939.  E. L. SCOVILLE  2,154,187

FISH SCALER

Filed May 10, 1937

Inventor
EARL L. SCOVILLE
By Edwin L. Yewell
his Attorney

Patented Apr. 11, 1939

2,154,187

UNITED STATES PATENT OFFICE 2,154,187

FISH SCALER

Earl L. Scoville, Ashtabula, Ohio

Application May 10, 1937, Serial No. 141,786

2 Claims. (Cl. 17—5)

This invention relates to improvements in devices for mechanically scaling fish.

One of the objects of this invention is to provide a fish scaler having a scaling burr built of separate sections whose positions can be changed to provide different types of burrs that are used for scaling different kinds of fish.

Another object of this invention is to provide a scaling burr that may be sharpened without removing it from the holder.

A further advantage obtained by this invention is that of having the scaling burr built up of separable units that may be easily and economically replaced.

These and other objects set forth hereinafter are attained by the means illustrated in the accompanying drawing, in which—

in Fig. 4 many of the teeth are omitted to show clearly the diagonal arrangement thereof;

Figure 1:
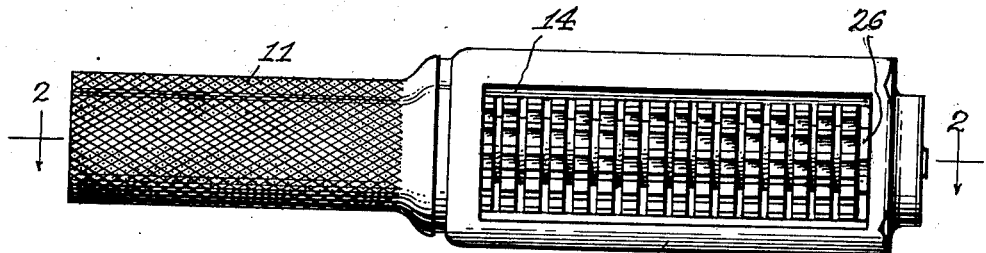
Fig. 1 is a plan view of the improved scaler, looking from the scraping side.
Figure 2:
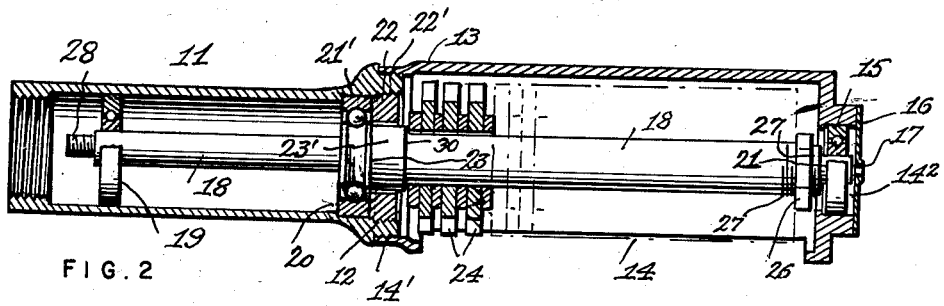
Fig. 2 is a longitudinal view taken on the line 2—2 of Fig. 1.
Figure 3:
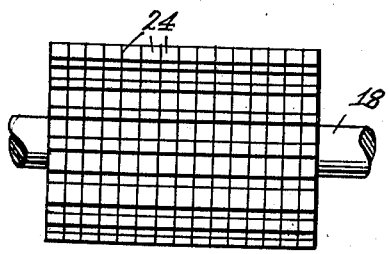
Figs. 3, 4, 5 and 6 are detail views of portions of the scaling burrs and their supporting shaft with the disk teeth arranged in different positions.
Figure 4:
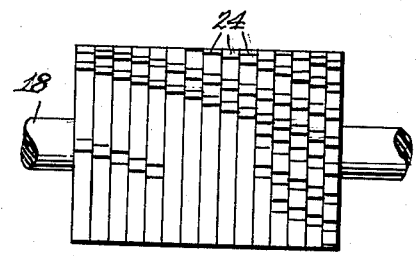
Figure 5:
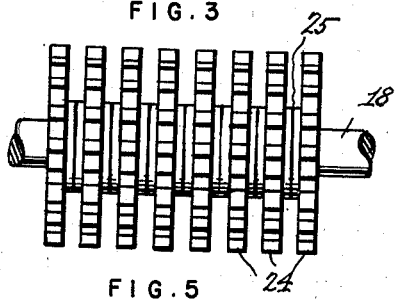
Figure 6:
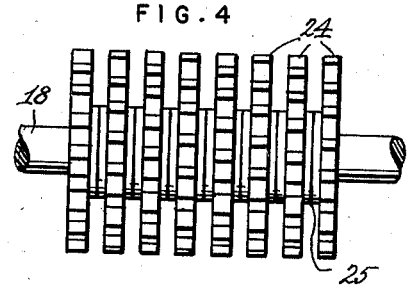
Figure 7:
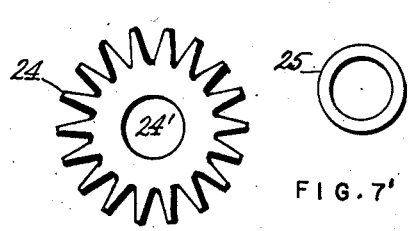
Figure 8:
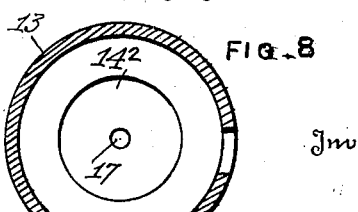

Figs. 7 and 7' are detail views of one of the scraping disks and separating washer or spacer respectively; and Fig. 8 is a cross-sectional view of the burr casing.

Like numerals designate like parts in the several views.

The scaling tool is comprised of a hollow tubular handle 11, having an enlarged threaded portion 12 and a guard housing 13 provided with an opening 14 on one side to permit the scaling burr to be brought into contact with the fish. The guard housing has a large threaded opening 14' at one end adapted to be screwed on the tubular handle and a smaller annular recess 14² at the opposite end in which is fitted a ball bearing race 15. A metal plate 16 is brazed or otherwise fastened over the opening to keep out foreign matter and has a small hole 17 through which the bearing 15 is lubricated. A shaft, designated by the numeral 18, having ball bearing races 19 and 20 pressed thereon and a spindle portion 21 at its outer end which rotates in the bearing race 15, is adapted to be rotated throughout its length. As will be noted in the drawing, the bearing race 20 fits in an annular recess 21' in the enlarged portion of the handle 11, and to keep the shaft and its associated parts from moving outwardly of the handle 11, a threaded bushing 22 is provided. This bushing 22 is threaded into an internally threaded recess 22' in the enlarged portion of the handle and abuts against the bearing race 20. The inner race of the intermediate bearing 20 is pressed on the shaft 18 against a shoulder 23 of an enlarged part 23' formed on the shaft.

The scaling burr is built up with series of spur disks 24 having sharpened teeth 24' for removing the scales of fish. These disks may be separated as far apart as required by one or more washers 25. Each of the disks 24 is provided with an aperture 24² at its center to receive the shaft 18. The disks and washers are placed on the shaft and the scaling edges set in any desired position relative to each other. The disks are held tightly in position by means of the nut 26, which is screwed on the threaded portion 27 of the shaft and forces the disks against the enlarged part 23' of the shaft.

By constructing the scaling burr in this manner, it is possible to vary the spaces between the scaling disks, and also to vary the radial relationship of the teeth of one disk relative to the teeth of adjacent disks, as is illustrated in Figs. 3, 4, 5 and 6. It is possible to form a burr having longitudinal blades see Fig. 3, spiral blades, see Fig. 4 staggered scaling teeth see Fig. 6 and separated longitudinally arranged scaling teeth see Fig. 5, thus making it possible to do a good scaling operation with any kind of fish.

The shaft 18 is threaded at 28 for receiving the conventional driving mechanism not shown.

As clearly shown in Fig. 7, each spur-disk is formed with a plurality of tapered radially extending teeth, the outer end surfaces of the teeth being preferably flat, so that they can be sharpened easily at any time desired by presenting the burrs to a grinding wheel or the like without dissembling the parts of the tool.

I claim:

1. In a fish scaling tool, embodying a tubular handle having an enlarged portion at one end, a burr casing detachably secured to said enlarged portion in alinement with the handle, an annular recess formed in said enlarged portion, an intermediate ball bearing fixed in the annular recess, a stop bushing threaded in said annular recess in front of the intermediate ball bearing, other ball bearings being fixed in the end of the handle and burr casing respectively, a shaft having an enlarged part forming an abutment, said shaft being mounted to rotate in all of said bearings, a burr comprising a plurality of burr disks mounted on said shaft, and an adjustable nut on the shaft for clamping said burr disks tightly together and against the abutment of the shaft.

2. In a fish scaler having a tubular handle and a burr casing secured thereto, a rotatable shaft mounted in the handle and casing, a plurality of burr disks mounted on said shaft, and means for clamping said burr disks together to permit them to rotate bodily as a unit together with the shaft, each of the burr disks being fitted loosely on the shaft to permit them to turn thereon independently of each other whereby the teeth can be arranged in different scraping positions.

EARL L. SCOVILLE.